Nov. 30, 1971  V. M. BERGER  3,623,423

COOKING UNIT WITH VARIABLE COOKING TEMPERATURE

Filed Sept. 16, 1970  2 Sheets-Sheet 1

INVENTOR.
VICTOR M. BERGER

BY
*Bauer & Amer*

ATTORNEYS

Nov. 30, 1971 V. M. BERGER 3,623,423
COOKING UNIT WITH VARIABLE COOKING TEMPERATURE
Filed Sept. 16, 1970 2 Sheets-Sheet 2

INVENTOR.
VICTOR M. BERGER
BY
Bauer & Amer
ATTORNEYS

United States Patent Office 3,623,423
Patented Nov. 30, 1971

3,623,423
COOKING UNIT WITH VARIABLE COOKING
TEMPERATURE
Victor M. Berger, 200—17 50th Ave.,
Bayside, N.Y. 11364
Filed Sept. 16, 1970, Ser. No. 72,629
Int. Cl. A47j 37/06
U.S. Cl. 99—446                                           5 Claims

ABSTRACT OF THE DISCLOSURE

A cooking unit having a smoke removal downdraft in communication with the cooking chamber thereof, said downdraft also removing heat from the cooking chamber whereby regulation of the volume of said downdraft results in a corresponding regulation of the cooking temperature within the cooking chamber.

---

The present invention relates generally to an improved cooking unit, and more particularly to an improved temperature control for the cooking unit.

There are currently available cooking units having an electrified grate or cooking surface, as exemplified by the cooking unit described and illustrated in U.S. Pat. 3,514,301 issued on May 26, 1970. Among noteworthy aspects of the aforesaid patented electrical grate is that it can and is usually operatively associated with a blower that creates a downdraft that is effective to remove smoke in the cooking area which is adjacent the electrified grate.

An important contribution of the present invention is the recognition that the smoke removal downdraft can be advantageously used for a further significant function, namely as an effective means of regulating the cooking temperature of the cooking unit. In known devices, cooking temperature control is achieved through use of rheostats and other electric current regulating devices which, although satisfactory, are costly and more susceptible to malfunction.

Broadly, an object of the present invention is to provide an improved cooking unit, of the type having an electrified grate, overcoming the foregoing and other shortcomings of the prior art. Specifically, it is an object to regulate the volume of smoke-removal air flow through the cooking chamber of the unit and, in turn, selectively regulate heat removal therefrom to provide any desired cooking temperature.

A temperature control for an electrified grate demonstrating objects and advantages of the present invention includes an air blower having a clearance position below the grate and effective to create an air current of a predetermined volume to remove smoke from about the grate, and air flow control means having an interposed position between the grate and the air blower effective to selectively vary the volume of said air curent flowing to the air blower, whereby the cooking temperature in the cooking chamber adjacent the grate is controllable as a function of the heat removed therefrom by said selected volume of air current flow.

Figure 1:
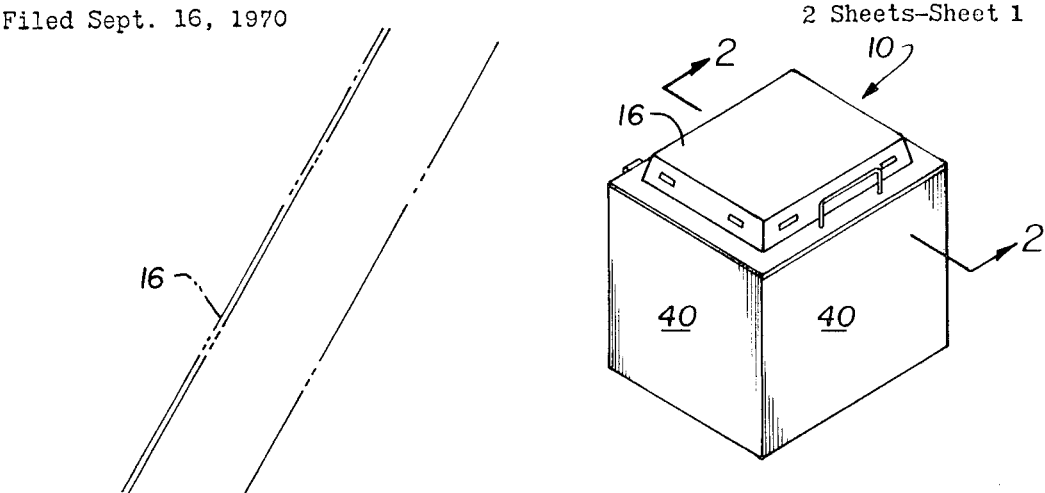
Figure 2:
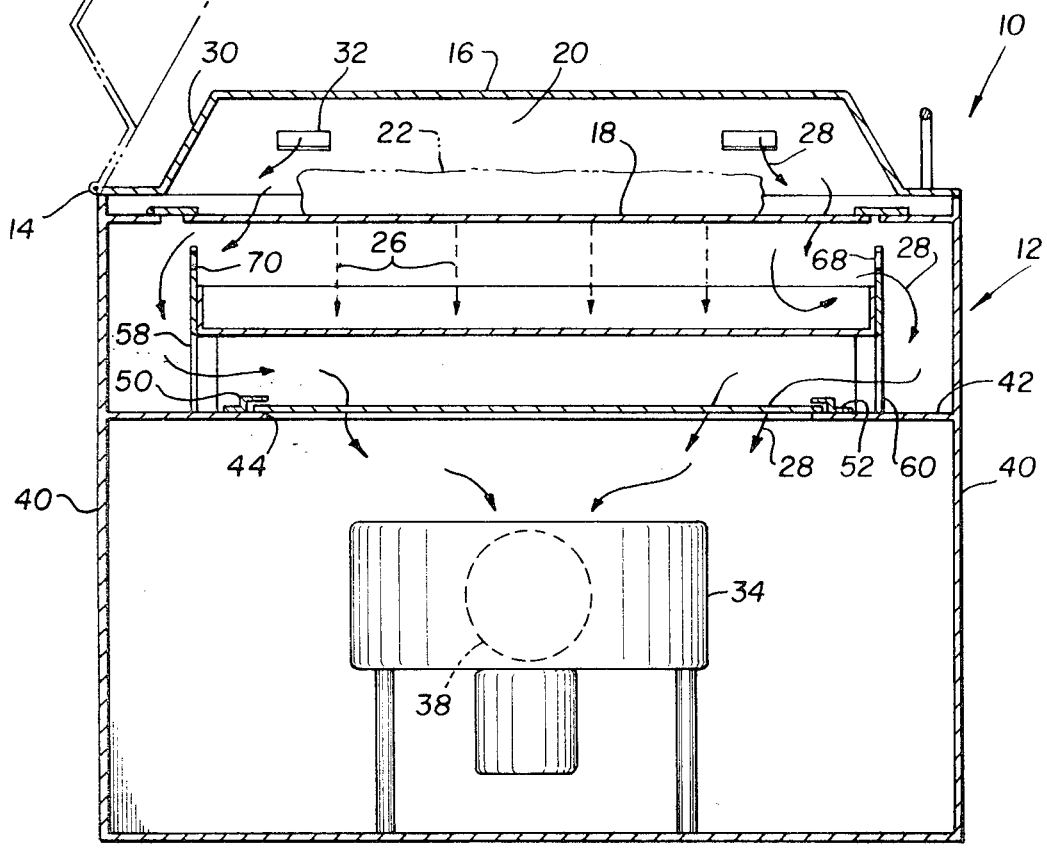
Figure 3:
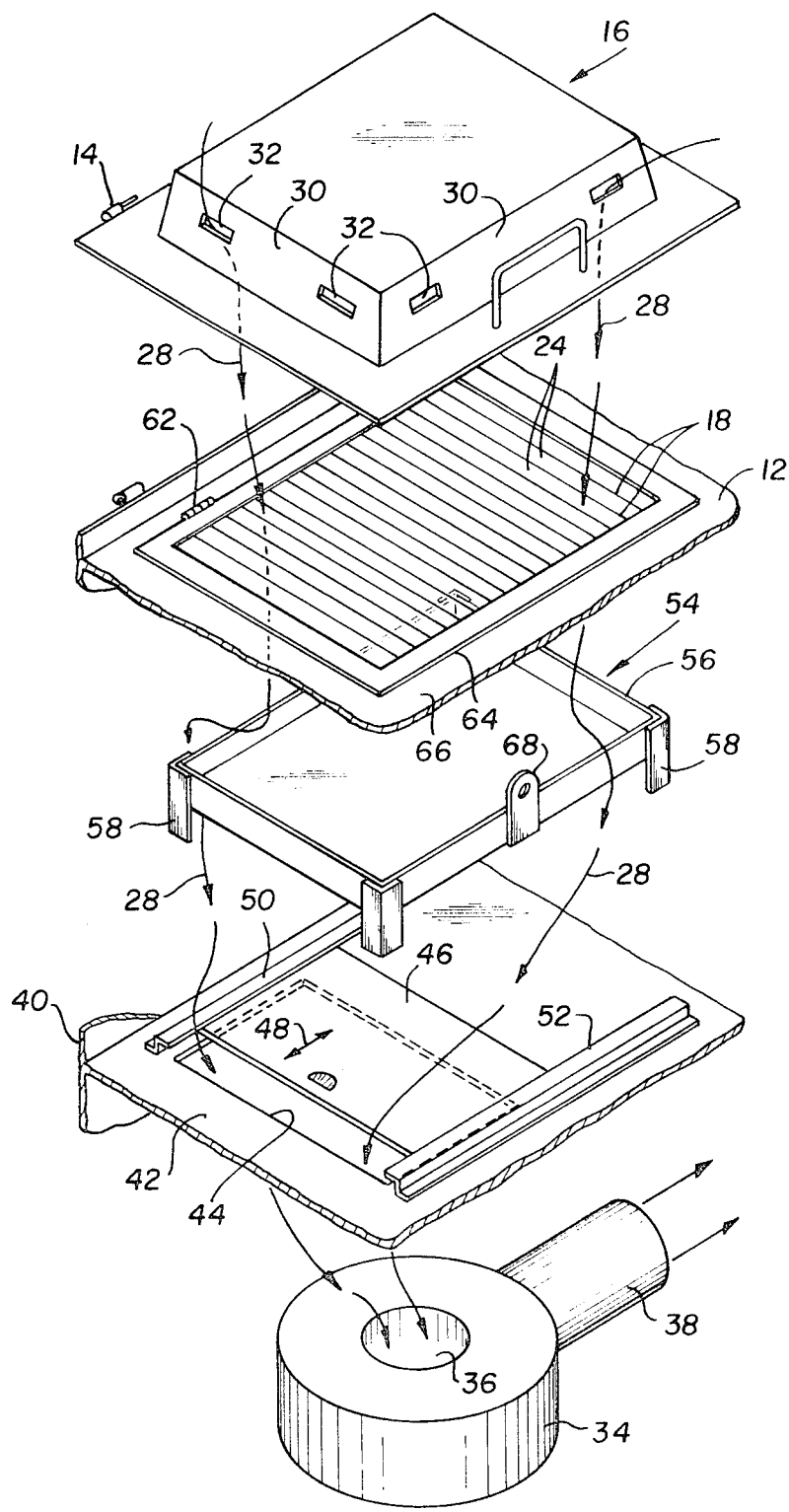

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of the cooking unit hereof;

FIG. 2 is a side elevational view, on an enlarged scale, taken in section along lines 2—2 of FIG. 1, illustrating internal structural features of the cooking unit and wherein the positions of movement of a pivotally mounted upper housing closure thereof is illustrated in full line and phantom perspective; and FIG. 3 is an exploded perspective view of the major component parts of the cooking unit illustrating the path of a current of air therethrough during a typical cooking interval of operation of the cooking unit.

Reference is now made to the drawings wherein there is shown a cooking unit, generally designated 10, demonstrating objects and advantages of the present invention. As best shown in FIG. 2, unit 10 consists essentially of two housing units, a comparatively large lower or base housing unit 12 to which is pivotally attached, as at 14, an upper pan-like housing or closure member 16. Mounted in an upper opening of the base 12 is an electrified grate 18 which may be of the type described and illustrated in U.S. Patent 3,514,301 issued on May 26, 1970. Grate 18 and pan 16 bound the cooking chamber 20 of the cooking unit 10, pan 16 being raised, as illustrated in phantom in FIG. 2, to permit placement of a cut of meat 22 or the like in a cooking position upon the electrified grate 18. Thereafter, pan 16 is moved into its closed position, as illustrated in full line in FIG. 2, in which it effectively confines the radiant heat of the grate 18 to the cooking chamber 20 and thereby contributes to the cooking operation of the electrified grate 18.

During a typical cooking interval of the unit 10, and as may best be understood from a consideration of FIG. 3 in conjunction with FIGS. 1 and 2, it is contemplated that the plural rectangular spaces 24, which exist between the individual bars which serve as the grate 18, will provide two essential functions. First, they readily permit grease and other liquid content, designated 26 in FIG. 2, to fall from the comparatively high temperature heat zone of the cooking chamber 20 to a cooler zone, located beneath the grate 18, which being at a lower temperature is therefore not likely to result in combustion of the grease drippings. Second, the spaces 24 are utilized, in a manner which will be described in greater detail subsequently, as openings in communication with the cooking chamber 20 through which smoke is removed which unavoidably results from cooking contact of the meat 22 with the electrified grate 18. This smoke removal is represented by the air flow arrows generally designated 28 in FIGS. 2 and 3. As will be readily appreciated, not only does the air current 28 remove smoke from the cooking chamber 20, but it unavoidably also removes heated air therefrom. An important aspect of the present invention is the recognition that by controlling the volume of the heated air removed by the air current 28, it is possible to correspondingly control the cooking temperature within the cooking chamber 20.

The manner in which cooking temperature control by air current flow is achieved in accordance with the present invention can perhaps best be understood in connection with FIG. 3. As illustrated therein, the upper pan 16 has side walls 30 appropriately provided with air inlet openings 32. While ordinarily the expansion of air within the cooking chamber 20, and thus beneath the pan 16, would cause an outflow of air through the openings 32, this direction of flow is reversed as a consequence of the operation of an air blower 34 which is appropriately mounted in a clearance position beneath the grate 18 within the base 12. The operation of the blower 24 is effective to establish an air current flow along the path 28 and includes inflowing air entering through the opening 32 into the cooking chamber 20. This incoming air, or air which it displaces from the cooking chamber 20, is next drawn by the blower 34 through the grating spaces 24 and flows along the path 28 into the blower inlet 36 and ultimately is exhausted to atmosphere through the outlet 38. Thus, the four side walls, individually and collectively designated 40 of the base 12, cooperate to define an air flow passage means between the grate 18 and the air blower 34.

As illustrated in FIG. 2, horizontally oriented across the aforesaid air flow passage of the base 12 is a wall 42 having an interposed position between the blower 34 and the grate 18. Wall 42 has a large rectangular opening 44 therein which serves as an air valve opening for the air passage bounded by the side walls 40.

As clearly illustrated in FIG. 3, slidably disposed in the opening 44 is a flat plate-like member 46 which slides between open and closed positions along the path 48 within the opening 44, thereby either enlarging or diminishing the extent of the opening that is available for passage of the air current 28 to the blower 34. Guide brackets 50 and 52 confine member 46 to tracking along the path 48.

This sliding movement 48 of member 46 has a controlling effect on the volume of the air current flow between the cooking chamber 20 and the air blower 34. That is, movement of the valve member 46 towards its fully closed position in the opening 44 reduces the volume of air that is drawn into the blower inlet 36 and causes a corresponding reduction in the volume of air flow along the path 28. Naturally, this reduced air flow is reflected in a diminished volume of heated air leaving the cooking chamber 20, and thus cooking within the chamber 20 is conducted at an elevated temperature. On the other hand, movement of the valve member 46 which results in enlargement of the opening 44 permits a greater volume of air to flow along the path 28 into the blower inlet 36. This results in a greater volume of heated air leaving the cooking chamber 20, and therefore the cooking temperature within the chamber is correspondingly reduced.

Previously noted horizontal wall 42 not only has an important function contributing to temperature control of the cooking chamber 20 as just described, but it also serves as a support for a grease-collecting member 54 which is located beneath the grate 18 in a covering position over the opening 44. As a consequence, the previously noted liquid content 26 from the meat or other food 22 being cooked within the cooking chamber 20 drips into the pan-like body 56 of the member 54, while legs 58 mintain the pan 56 in an appropriate clearance position above the opening 44 so that the air 28 flows unimpeded through clearance 60 (see FIG. 2) and then through the opening 44 to the air blower inlet 36.

After a typical cooking interval of operation of the cooking unit 10, it may be necessary to remove the grease-collecting member 54 for cleaning. This is readily achieved by pivoting the upper housing enclosure 16 into its raised position and also by pivoting the electrified grate 18 about the pivot axis 62 into a similarly raised position. This movement of the grate 18 provides an access opening 64 in the top wall 66 of the base 12 through which member 54 is readily removed for cleaning. Facilitating this removal are opposite hand grips 68 and 70.

From the foregoing, it should be readily appreciated that there has been described herein a cooking unit 10 having a noteworthy temperature control for regulating the cooking temperature within the cooking chamber 20. This control more particularly, as described herein, consists of controlling the volume of a downdraft of air which is established between the cooking chamber 20 and an air-flow creating means, such as the air blower 34. This temperature control may be in lieu of or may supplement other temperature controls such as rheostats which regulate the current flow to the heating elements of the electrified grate 18.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. A cooking unit comprising a cooking chamber bounded on opposite sides by a housing enclosure and by an electrified grate, said grate having openings therein for the passage of a current of air effective to remove heat and smoke from said cooking chamber, an air blower having a clearance position below said cooking chamber effective to create said air current for said heat and smoke removal of a predetermined volume, and air flow control means having an interposed position between said grate and said air blower effective to selectively vary the volume of said air current flowing from said cooking chamber to said air blower, whereby the cooking temperature in said cooking chamber is controllable as a function of the heat removed therefrom by said selected volume of air current flow.

2. A cooking unit as defined in claim 1 wherein said air flow control means includes means defining an air flow passage between said grate and said air blower, and an air valve means in said air flow passage effective to control the volume of the air current flowing through said air flow passage.

3. A cooking unit as defined in claim 1 wherein said air valve means comprises a horizontally oriented wall having an air flow opening therein, and a closure member arranged for sliding movement between open and closed positions in said air flow opening.

4. A cooking unit as defined in claim 3 including a grease-collecting member having a clearance position over said air flow opening, said air flowing through the clearance beneath said member into said air flow opening.

5. A cooking unit as defined in claim 4 wherein said grease-collecting member is detachably disposed over said air flow opening so as to be readily removable therefrom preparatory to the cleaning thereof.

References Cited

UNITED STATES PATENTS

| 461,953 | 10/1891 | Edmonds. | |
|---|---|---|---|
| 868,753 | 10/1907 | Barrett | 126—41 |
| 2,923,229 | 2/1960 | Halford | 99—339 |
| 2,943,557 | 7/1960 | Suehlsen | 99—446 X |
| 3,368,062 | 2/1968 | Gramenius et al. | 126—21 A X |
| 3,444,805 | 5/1969 | Happel et al. | 99—340 |
| 3,514,301 | 5/1970 | Berger | 99—450 X |

WALTER A. SCHEEL, Examiner

A. O. HENDERSON, Assistant Examiner

U.S. Cl. X.R.

99—450; 126—41